United States Patent [19]
Freitag et al.

[11] 3,724,797
[45] Apr. 3, 1973

[54] RESILIENT SEAT

[75] Inventors: Herbert Freitag, Koblenz-Lutzel; Wilhelm Westerteiger, Oberlahnstein, both of Germany

[73] Assignee: Stabilus Industrie und Handelsqesellschaft mbH, Koblenz-Neuendorf, Germany

[22] Filed: Feb. 4, 1971

[21] Appl. No.: 112,552

[30] Foreign Application Priority Data

Feb. 17, 1970 Germany ............... P 20 07 140.3

[52] U.S. Cl. .............................. 248/400, 248/421
[51] Int. Cl. ...................................... F16m 13/00
[58] Field of Search ........... 248/350, 399, 400, 421; 267/113, 116, 117, 118, 120, 122, 123, 124, 125, 128, 129

[56] References Cited

UNITED STATES PATENTS

| | | | |
|---|---|---|---|
| 2,760,552 | 8/1956 | Decker | 248/400 UX |
| 2,590,859 | 4/1952 | Hickman | 248/400 X |
| 2,717,629 | 9/1955 | Badhorn | 248/399 X |
| 2,981,281 | 4/1961 | Peras | 267/122 X |
| 3,203,723 | 8/1965 | Montenare | 267/116 X |
| R26,162 | 2/1967 | Simons et al. | 248/400 |

*Primary Examiner*—William H. Schultz
*Attorney*—Kelman and Berman

[57] ABSTRACT

The seat for a chair or vehicle has two box-shaped portions which telescopically engage each other for vertical expansion and contraction of the seat. A pneumatic spring mounted in the space enclosed by the boxes biases the boxes apart by means of levers carrying links or rollers or by means of cams and rollers. The spring axis is horizontal so that the minimum height of the seat is very small.

12 Claims, 6 Drawing Figures

INVENTORS
Herbert Freitag
Wilhelm Westerteiger
BY: Kelman and Berman
AGENTS

RESILIENT SEAT

This invention relates to seats for chairs, vehicles, and the like, and particularly to a resilient seat whose resiliency is due mainly or exclusively to a pneumatic spring interposed between a base portion and a supporting portion, the latter portion directly supporting the weight of a seated person and moving toward the base portion under the weight against the restraint of the pneumatic spring.

Pneumatic springs have known advantages over coil springs and similar springs which rely on elastic deformation of a solid body. It has been proposed heretofore to install pneumatic springs in chairs and like devices, the cylinder of the spring being mounted upright on the frame of the chair, and the supporting portion of the seat being mounted on the piston rod. Because of the necessary, relatively great height of the spring, the spring could not readily be concealed in most chairs, and the applications of pneumatic springs to chairs were limited to utilitarian pieces of furniture.

It is an object of this invention to provide a seat with a pneumatic spring in such a manner that the axial length of the spring has no bearing on the appearance of the chair. More specifically, the invention aims at providing a seat of the type described in which the axis of the pneumatic spring is approximately horizontal or approximately parallel to the normal supporting plane defined by the upper or supporting portion of the chair which is guided in the base portion so that the several positions of the supporting plane are parallel to each other.

In its more specific aspects, the invention provides a seat having a base portion and a supporting portion, the latter defining a plane of support. Guide means connect the portions for movement of the supporting portion toward and away from the base portion between a plurality of positions. The positions of the supporting plane in these positions of the supporting seat portion are substantially parallel to each other as long as the base portion is stationary during the movement of the supporting portion.

The seat further includes a pneumatic spring which has a cylinder, a piston received in the cylinder for axial movement and dividing the interior of the cylinder into two compartments, and a piston rod secured to the piston for joint axial movement into and out of the cylinder interior. The piston rod and cylinder are fastened to the base and supporting portions of the seat respectively in such a manner that the axis of the spring is kept approximately parallel to the supporting plane in the several positions of the supporting portion.

Other features, additional objects, and many of the attendant advantages of this invention will readily become apparent from the following detailed description of preferred embodiments when considered in connection with the appended drawing in which.

Figure 1:
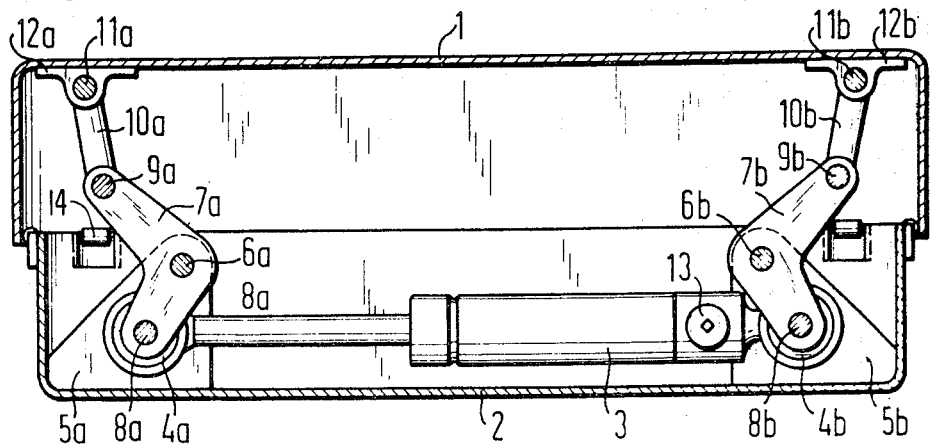
FIG. 1 shows a seat of the invention in side-elevational section.
Figure 2:
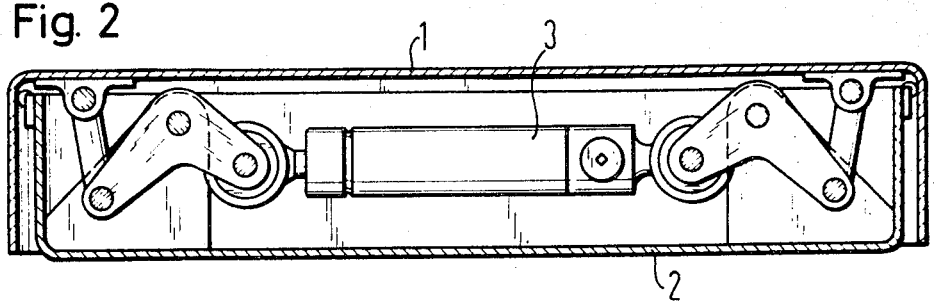
FIG. 2 illustrates the seat of FIG. 1 in the position assumed when loaded to capacity.

Referring initially to FIGS. 1 and 2, there is seen a resilient seat for a chair, a vehicle, or the like, whose visible components are two shallow, open rectangular boxes 1,2. The open sides of the boxes are directed toward each other, and the smaller box 2, which forms the base portion of the seat, is at least partly received in the slightly larger box 1 in all operative positions of the seat. The supporting surface of the seat is formed by the exposed upper surface of the bottom wall in the box 1 in the normal, inverted operating position of the latter, as shown in the drawing. The dimensions of the two boxes are chosen so that the box 1 can move telescopically toward and away from the box 2, and the bottom walls of the two boxes are kept parallel by guiding engagement of the upright walls of the box 1 with guide rollers 14 on the box 2.

The space enclosed, but not sealed by the boxes 1,2 holds a pneumatic spring 3 of the conventional type consisting mainly of a cylinder, a piston axially movable in the cylinder, but not explicitly shown in FIGS. 1 and 2, and a piston rod which is attached to the piston and projects axially from the piston through a radial end wall of the cylinder. The piston axially divides the cylinder cavity into two compartments, and the compartment remote from the piston rod is sealed and filled with a fluid, such as air or nitrogen, under a pressure much higher than atmospheric pressure, as will be described in more detail hereinafter with reference to FIG. 6. In the relaxed condition of the spring shown in FIG. 1, the piston rod is expelled from the cylinder cavity to the extent determined by an equilibrium between the force of the gas in the spring 3 and forces opposing expansion of the gas, such as the weight of the supporting portion 1.

Eyes 4a,4b on the ends of the piston rod and of the cylinder which are remote from each other and brackets 5a,5b fixed on the inner face of the seat base 2 are connected by respective arms of identical bellcrank levers 7a,7b, the free ends of the arms being secured to the eyes 4a,4b by pivot pins 8a,8b, and the levers being fulcrumed on the brackets 5a,5b by shafts 6a,6b. Hinge pins 9a,9b on the free end of the other arm of each lever 7a,7b and hinge pins 11a,11b on brackets 12a,12b on the inner wall of the supporting box 1 are connected by identical links 10a,10b. It will be understood, and is explicitly shown in FIG. 5 with reference to a modified embodiment of the invention, that the levers, links, and brackets illustrated are duplicated by a second set of identical elements connected to the two seat portions 1,2 and to the common pneumatic spring 3 so that the upper seat portion 1 is supported in four points.

The rollers 14, shafts 6a,6b, levers 7b, links 10a, 10b and hinge pins 11a, 11b are arranged and dimensioned so that the supporting surface of the upper box 1 remains horizontal when the base 2 rests on a horizontal surface and the supporting upper box 1 is moved toward the base 2 by the weight of a person or other load acting on the exposed upper wall of the box 1. When the weight applied exceeds the design value, the upper box 1 ultimately comes to rest in a position closely similar to that of FIG. 2 in which the two seat portions abuttingly engage each other or the rim of the box 1 engages a surface on which the base 2 rests. The pneumatic spring 3 resists downward movement of the upper box 1 and returns the box to the position shown in FIG. 1 when the load is removed. The response of the pneumatic spring to an applied load may be adjusted by means of a knob 13.

The base portion 2 and supporting portion 1 of the seat illustrated in FIG. 1 are connected so that the seat may be up-ended or inverted without separation of its two principal portions. This is not always necessary, and the modified seats shown in FIGS. 3 to 5 partly rely on the weight of the supporting portion or upper box 1 for holding the boxes assembled.

Figure 3:
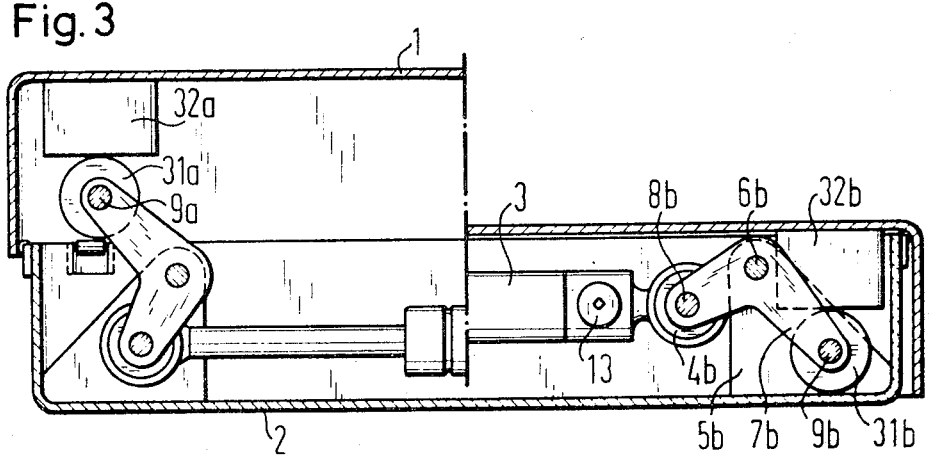
FIG. 3 shows a modification of the seat of FIG. 1, the view of the left half of FIG. 3 corresponding to that of FIG. 1, and the right half of FIG. 2.

The embodiment illustrated in FIG. 3 is essentially identical in outward appearance with the seat described with reference to FIGS. 1 and 2, and the space enclosed by the boxes 1,2 holds a spring 3. The eye 4b on the cylinder of the pneumatic spring 3 is connected by a pivot pin 8b to a bellcrank lever 7b which is fulcrumed on a bracket 5b by a shaft 6b, and the analogous devices are associated with the piston rod of the spring 3, as described above.

The modified seat lacks the links 10a,10b, and the pins 9a,9b carry respective rollers 31a,31b. Prismatic, rectangular blocks 32a,32b project downwardly from the horizontal wall of the box 1 to which they are fixedly fastened, and rest on the rollers 31a,31b respectively. The blocks are so dimensioned that they fit between the shafts 6a,6b of the associated bellcrank levers and the upright walls of the box 2 in the collapsed condition of the seat, as shown on the right side of FIG. 3.

When the seat moves between the two extreme positions illustrated in FIG. 3, the rollers 31a,31b moves along the undersides of the blocks 32a,32b, and the horizontal orientation of the supporting surface of the seat is maintained by its symmetrical construction and by the telescoping side walls.

The range of movement of the rollers 31a,31b on the faces of the blocks 32a,32b is small, and the increase in friction losses caused when stationary engagement members are mounted on the pins 9a,9b, is insignificant in many instances. A particularly inexpensive seat arrangement is arrived at when the pins 9a,9b assume the function of engaging the faces of the blocks 32a,32b, and other types of engaging members will readily suggest themselves.

Figure 4:
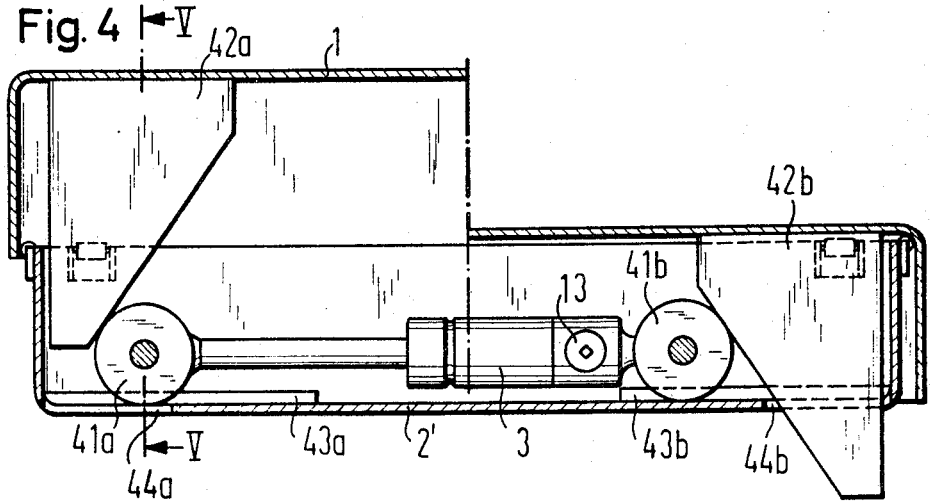
FIG. 4 shows yet another seat of the invention in the manner of FIG. 3.
Figure 5:
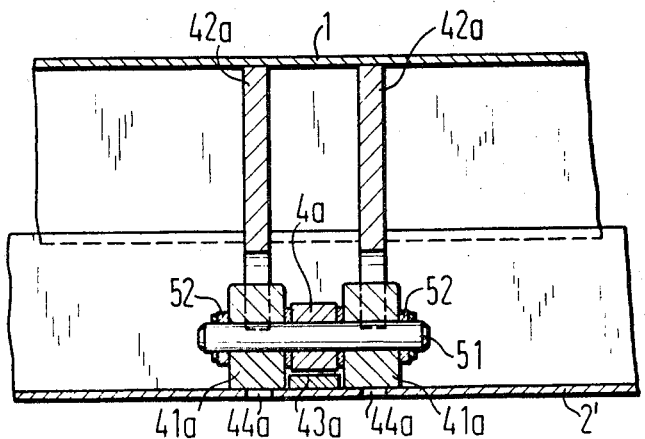
FIG. 5 shows the seat of FIG. 4 in fragmentary front elevation on the line V — V.

If the blocks 32a,32b, whose faces are parallel to the plane of support, are replaced by cams 42a,42b having faces obliquely inclined relative to the plane, as shown in FIGS. 4 and 5, the need for bellcrank levers no longer arises, and pairs of rollers 41a,41b or other engaging members can be mounted directly on shafts 51 which pass through the eye 4a on the piston rod and the corresponding eye, not seen in FIGS. 4 and 5, on the cylinder of the pneumatic spring 3.

The spring, not being supported otherwise, rests by means of the rollers on the horizontal bottom wall of the base portion 2'; identical with the afore-described box 2 except for slots 44a,44b which accommodate the cams 42a,42b in and near the collapsed condition of the seat. The rollers are axially secured on the shafts 51 by retaining rings 52 and are guided on the base portion 2' by ribs 43a,43b extending between the rollers of each pair.

Figure 6:
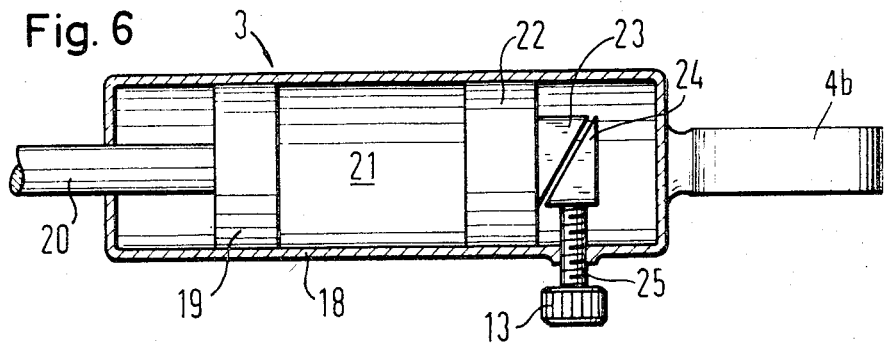
FIG. 6 shows the pneumatic spring common to the seats of FIGS. 1,3,4, and 5 in fragmentary section on its axis.

FIG. 6 shows the pneumatic spring 3 common to the several seats of the invention described above in fragmentary axial section, and particularly the adjusting mechanism which permits varying the rate of axial piston movement in the spring 3 in response to a force tending to move the supporting portion 1 toward the base portion 2,2'.

The cylinder 18 of the spring carries the fixedly attached eye 4b and encloses the piston 19 from which the piston rod 20 extends outward of the cylinder 18. The compressed gas cushion 21 in the cylinder 18 which biases the piston rod 20 outward of the cylinder 18 is axially bounded by the piston 19 and a plug 22 axially slidable in the cylinder 18 in sealing engagement with the inner wall of the latter. Gaskets and sealing rings have been omitted from the showing of FIG. 6 for the sake of clarity since they may be entirely conventional.

A cam 23 fixedly mounted on the face of the plug 22 directed axially toward the eye 4b cooperates with a cam 24 for maintaining a selected axial position of the plug 22 under the pressure of the cushion 21. The cam 24 is freely rotatable on a supporting, threaded spindle 24 which passes through a threaded, radial bore in the cylinder 18 in a direction parallel to the supporting surface of the seat. It carries the afore-mentioned knob 13. When the knob is turned, the plug moves axially under or against the pressure of the gas cushion 21, and the latter may be compressed or expanded in volume while the position of the piston 19 is fixed, whereby the spring characteristics of the pneumatic spring 3 may be varied.

The length of the spindle 25 in the seats shown in FIGS. 3 to 5 may be as illustrated in FIG. 6 so that the knob 13 is normally concealed in the cavity bounded by the base portion 2,2' and the supporting portion 1 of the seat, but may be reached after lifting the supporting portion from the base portion. In the seat shown in FIGS. 1 and 2, the spindle 25 is made long enough so that it extends outward of the base portion 2, through slots in the upright walls of the latter and the supporting portion 1 not seen in FIGS. 1 and 2, the non-illustrated slots being arcuately shaped to permit unhampered movement of the spring 3 between the positions illustrated in FIGS. 1 and 2. The knob 13, shown in FIGS. 1 and 2 will therefore be understood to be closely adjacent the outer face of the non-illustrated upright wall of the supporting portion 1 in the condition of the seat illustrated in FIG. 2, and spacedly adjacent the corresponding outer face of the base portion 2 in the condition of FIG. 1. The same arrangement, of course, may be chosen in the seats of FIGS. 3 to 5.

As has not been shown explicitly in the drawing, the base portion 2 or 2' may be mounted atop a tubular column standing on a base which may be equipped with casters or other devices to permit rotation of the illustrated seat about a vertical axis, and other applications will be obvious to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A seat comprising, in combination:
   a. a base portion;
   b. a supporting portion defining a plane of support;
   c. guide means connecting said portions for movement of said supporting portion in a direction transverse to said plane toward and away from said base portion between a plurality of positions,
      1. the positions of said plane in said positions of said supporting portion being substantially parallel to each other when said base portion is stationary during said movement;
   d. a pneumatic spring including a cylinder member having an axis transverse to said direction, piston means received in said cylinder member for axial movement and axially bounding a compartment in said cylinder member, and a piston rod member secured to said piston means for movement therewith inward and outward of said cylinder member; and
   e. motion transmitting means respectively connecting said members to said portions and keeping said axis approximately parallel to said plane in said positions of the supporting portion.

2. A seat as set forth in claim 1, wherein said portions are telescopically engaged and substantially enclose a space therebetween, said spring being mounted in said space.

3. A seat as set forth in claim 2, wherein said motion transmitting means include two lever members, each lever member being pivotally mounted in said space on one of said portions, and hinge means connecting said lever member to a respective member of said spring and to the other portion.

4. A seat as set forth in claim 3, wherein said two lever members are mounted on said base portion.

5. A seat as set forth in claim 4, wherein said hinge means include a link hingedly connecting each lever member to said supporting portion.

6. A seat as set forth in claim 2, wherein said motion transmitting means include two lever members, each lever member being pivotally mounted in said space on one of said portions and carrying an engaging member, said engaging member movably engaging a face on the other portion.

7. A seat as set forth in claim 6, wherein said lever members are each mounted on said base portion, and said engaging member is a roller.

8. A seat as set forth in claim 7, said face being substantially parallel to said plane.

9. A seat as set forth in claim 2, wherein said motion transmitting means include engaging members on said piston rod member and on said cylinder member respectively, and two cam members on one of said portions, each engaging member movably engaging a respective one of said cam members and the other portion.

10. A seat as set forth in claim 9, said engaging members being rollers rotatably mounted on said piston rod member and on said cylinder member respectively.

11. A seat as set forth in claim 1, further comprising adjusting means for varying the rate of said axial movement of the piston means in said cylinder member in response to a force tending to move said supporting portion toward said base portion.

12. A seat as set forth in claim 11, wherein said adjusting means include means for varying the volume of said compartment while said piston means stands still, said means for varying said volume including an adjustment member rotatable about an axis substantially parallel to said plane and transverse to the axis of said cylinder member.

* * * * *